(12) United States Patent
Uematsu et al.

(10) Patent No.: US 7,817,022 B2
(45) Date of Patent: Oct. 19, 2010

(54) VISION ENHANCEMENT DEVICE FOR USE IN VEHICLE

(75) Inventors: Hiroshi Uematsu, Wako (JP); Yuya Kishimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 261 days.

(21) Appl. No.: 12/026,144

(22) Filed: Feb. 5, 2008

(65) Prior Publication Data
US 2008/0186156 A1 Aug. 7, 2008

(30) Foreign Application Priority Data
Feb. 6, 2007 (JP) .............................. 2007-027359

(51) Int. Cl.
*B60R 25/10* (2006.01)
(52) U.S. Cl. .................... 340/438; 340/441; 340/426.32
(58) Field of Classification Search .................. 340/438
See application file for complete search history.

(56) References Cited

U.S. PATENT DOCUMENTS 3,469,234 A * 9/1969 Greacen ..................... 340/435
3,603,929 A * 9/1971 Drysdale ..................... 340/435
5,506,595 A * 4/1996 Fukano et al. .................. 345/7
5,510,983 A * 4/1996 Iino ............................. 701/1
2007/0279317 A1* 12/2007 Matsumoto et al. ............ 345/7
2009/0135092 A1* 5/2009 Uematsu et al. ............... 345/7

FOREIGN PATENT DOCUMENTS

GB 2224475 A * 5/1990
GB 2419118 A * 4/2006
JP 08-227498 9/1996

* cited by examiner

*Primary Examiner*—Travis R Hunnings
(74) *Attorney, Agent, or Firm*—Rankin, Hill & Clark LLP (57) ABSTRACT

A vision enhancement device for use in a vehicle that improves the frontward vision of an operator during operation. The device has two dividing lines set apart from each other on an instrument panel. These dividing lines show as false image lines on an inside surface of a front window, and divide the inside surface of the front window into a plurality of areas in a vertical direction. A second area formed between these two false image lines forms an appropriate visual field range when the operator looks forward while operating the vehicle. First light emitting means comprising light emitting diodes are disposed at both ends of each of the two dividing lines. The light emitted by these light emitting diodes is directed onto the front window as a false image in accordance with changes in the vehicle state and the environment around the vehicle.

9 Claims, 11 Drawing Sheets

VISION ENHANCEMENT DEVICE FOR USE IN VEHICLE

FIELD OF THE INVENTION

The present invention relates to a vision enhancement device which can be used in a vehicle, which can improve vision in a predetermined area of the windshield (front window), and which can quickly improve the recognition of operating conditions and the like.

BACKGROUND OF THE INVENTION

In recent years, there have been attempts to improve visual recognition of various types of vehicle information without disrupting the attitude (line of sight) of the operator in vision enhancing devices for use in a vehicle.

In vision enhancing devices of this type for use in a vehicle, priority is given to ensuring a sufficient visual field from the windshield, and a head-up display for use in a vehicle, which reflects operating information and the like on the windshield, is used in order to allow quick recognition of the state of the vehicle during operation.

Such a head-up display is disclosed in Japanese Patent Application Laid-Open Publication No. 8-227498 (JP 08-227498 A). This head-up display is latterly installed in vehicles that do not have a predetermined installation location.

Figure 13:
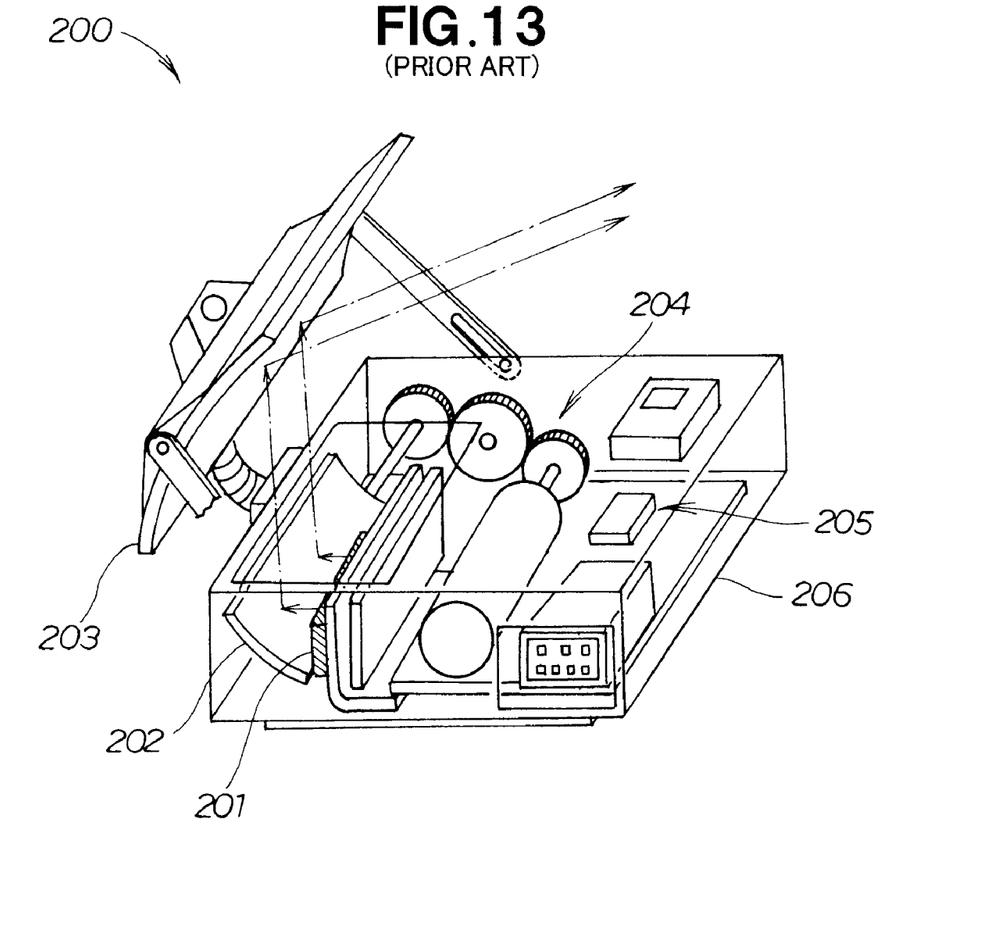
FIG. 13 is a perspective view of a conventional head-up display for use in a vehicle.

The abovementioned head-up display will be described below with reference to FIG. 13 hereof.

The conventional head-up display 200 comprises a fluorescent display tube 201 for generating light information, a first reflective plate 202 for reflecting the light information generated by this fluorescent display tube 201; a second reflective plate 203 for reflecting the light information reflected by this first reflective plate 202, and emitting this light information toward the vehicle operator; a driving part 204 for driving the first reflective plate 202; a control part 205 for controlling this driving part 204, and lighting the fluorescent display tube 201; and a case 206 for accommodating the fluorescent display tube 201, first reflective plate 202, driving part 204, and control part 205, and for supporting the second reflective plate 203 in a manner that allows variation.

However, in a vehicle head-up display 200 of such description, the line of sight must be temporarily directed toward the display in order to confirm the content displayed by the display.

Furthermore, in the abovementioned head-up display 200, the content of the display is diverse, which can create a sense of confusion.

SUMMARY OF THE INVENTION

It is an object of the present invention to provide a vision enhancement device for use in a vehicle which can improve the visual recognition of operation while maintaining the line of sight of the operator in a position that is appropriate for operation, and which can inform the operator of the state of the vehicle in a simple manner.

According to an aspect of the present invention, there is provided a vision enhancement device for use in a vehicle, which comprises: dividing means for making a projection substantially horizontally on a surface of a windshield of the vehicle and thereby dividing the windshield into a plurality of areas. The dividing means being formed such that when the projection is made onto the windshield so as to correspond to a position of a road surface that is a predetermined distance ahead with a vantage point position of an operator used as a starting point. The vision enhancement device further comprising a projection width on the windshield is the same as or smaller than a lane width of the road, wherein the dividing means comprise false image generating means disposed beneath the windshield for showing a false image on the windshield, and first light emitting means for emitting light for at least a portion of the dividing means, the false image generating means being configured so as to form a rectilinear false image that can be recognized in a substantially rectilinear manner from the vantage point position of the operator. The first light emitting means being designed to emit light more brightly in one portion of the rectilinear false image than in another portion.

When a projection is made for the road surface a predetermined distance ahead with the vantage point position of the operator as a starting point, the dividing means makes a projection onto the windshield so that the projection width is the same as or smaller than the lane width area. Consequently, the operator unconsciously tends to move the vehicle toward the center of the lane, and can be prompted to perform stable driving.

The first light emitting means is caused to emit light in accordance with changes in the vehicle state and environment surrounding the vehicle, and caused to show this light on the windshield, whereby the operator can be informed that there have been changes in the vehicle state or environment surrounding the vehicle. Specifically, the dividing means is a false image generating means which is disposed beneath the windshield, and forms a substantially rectilinear false image that can be recognized in a substantially rectilinear manner from the vantage point position of the operator. The dividing means comprises first light emitting means is caused to emit light more brightly in one portion of the substantially rectilinear false image than in another portion. Accordingly, the operator can be quickly informed of diverse types of vehicle information without their visual field of the operator being altered.

Preferably, the false image generating means comprises dividing lines formed on an instrument panel disposed beneath the windshield. Accordingly, the dividing lines formed on the instrument panel will be reflected in the windshield, which can be divided into a plurality of regions. As a result, the false image generating means can be readily constructed.

Desirably, the false image generating means comprises second light emitting means for forming a substantially rectilinear false image that can be recognized in a substantially rectilinear manner from the vantage point position of the operator. This second light emitting means can also transmit diverse types of vehicle information without the visual field of the operator being altered.

In a preferred form, the second light emitting means emits light of a color that differs from that of the first light emitting means. Accordingly, the types of information transmission can be increased.

The first and second light emitting means may be constructed such that at least a portion of these means are capable of flashing. As a result of this flashing, the types of information transmission can be further increased.

According to a second aspect of the present invention, there is provided a vision enhancement device for use in a vehicle, which comprises: dividing means for making a projection substantially horizontally on a surface of a windshield of a vehicle and thereby dividing the windshield into a plurality of areas. The dividing means being formed so that when the projection is made onto the windshield so as to correspond to a position of a road surface that is a predetermined distance ahead with a vantage point position of an operator used as a starting point. The vision enhancement device further comprising a projection width on the windshield is the same as or smaller than a lane width of the road, wherein the dividing means is disposed beneath the windshield for showing a false image on the windshield. The false image being substantially rectilinear as seen from the vantage point position of the operator, the entirety of the substantially rectilinear false image having a plurality of colors.

Thus, by varying the light emitted by the dividing means in accordance with variations in the vehicle state and environment surrounding the vehicle, the operator can recognize that there have been variations in the vehicle state or environment surrounding the vehicle. For example, an emergency can be expressed by the color of the emitted light.

Preferably, at least one portion of the dividing means flashes. In addition to the changing of the emitted light color, an operation whereby the emitted light color itself flashes can be performed. In this way, when there is an emergency variation in the vehicle state or environment surrounding the vehicle, this emergency can be expressed in greater detail.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Reference is now made to FIGS. 1 through 7 showing a vision enhancement device for use in a vehicle according to a first embodiment of the present invention.

Figure 1:
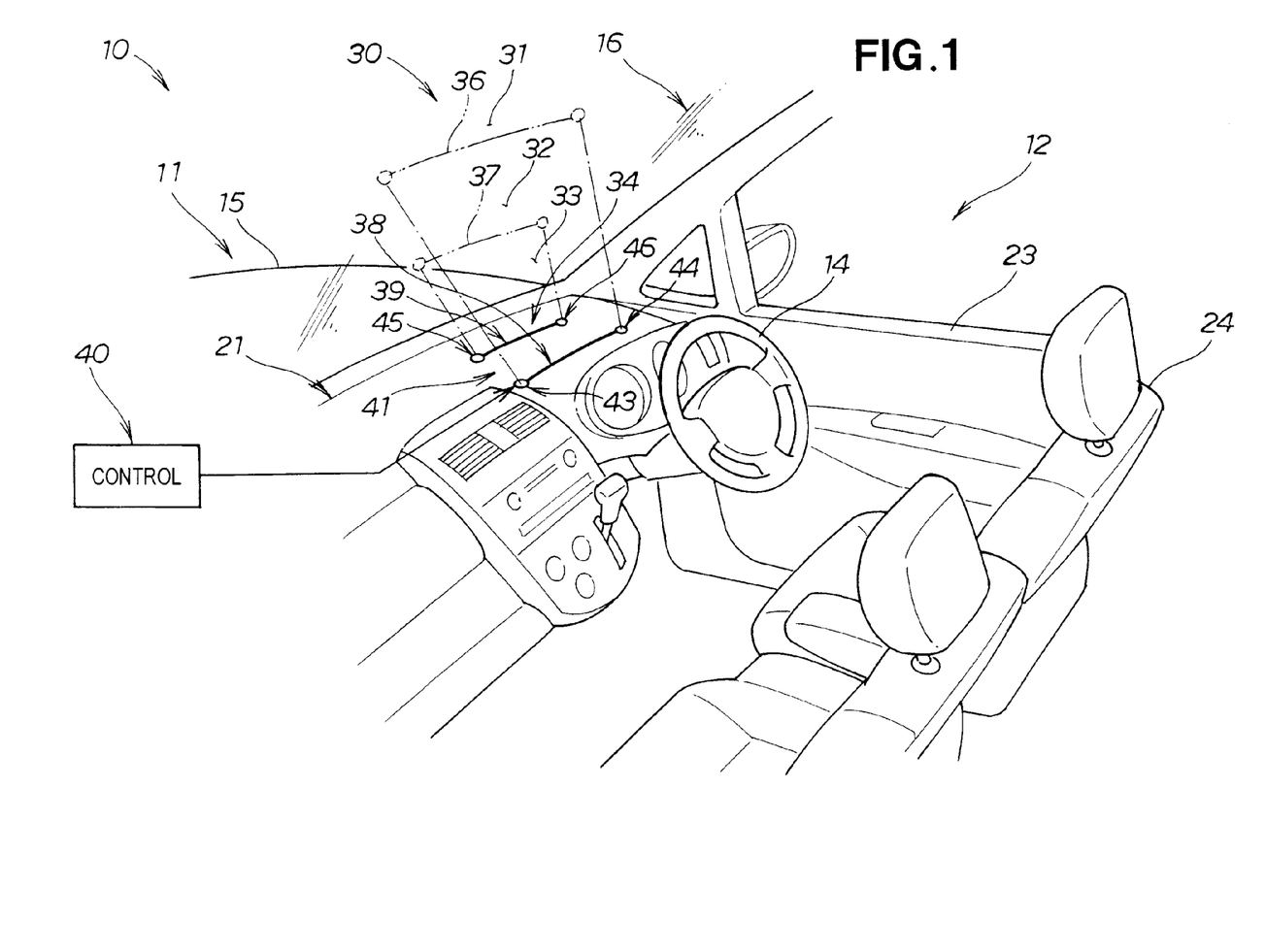
FIG. 1 is a perspective view of a vision enhancement device for use in a vehicle, according to a first embodiment of the present invention, as seen from the inside of the passenger compartment.
Figure 2:
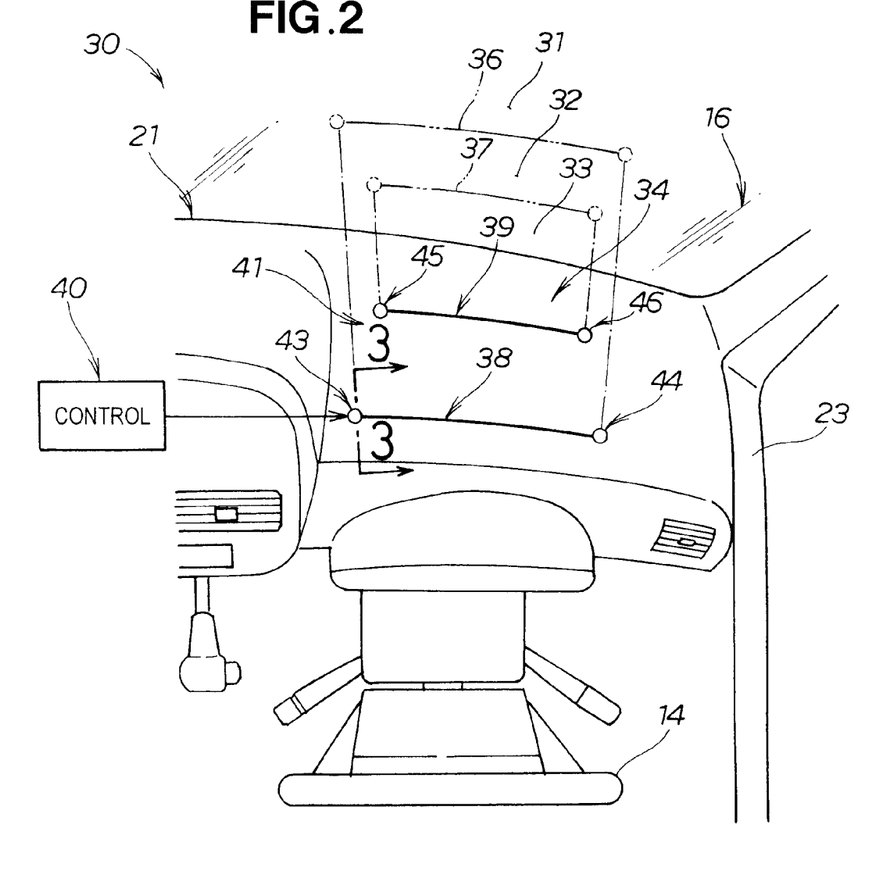
FIG. 2 is a plan view of the vision enhancement device shown in FIG. 1.

A vehicle 10 shown in FIGS. 1 and 2 comprises a steering wheel 14 for steering a vehicle body 11; a hood 15 for covering a front part of the vehicle body 11; a windshield (front window) 16 for covering a front part of a passenger compartment 12 in a transparent manner; and a roof 17 (see FIG. 6) for covering an upper part of the passenger compartment 12. The vision enhancement device further comprising an instrument panel 21 disposed in a front part of the passenger compartment 12; doors 23 for covering side surfaces of the passenger compartment 12; a vehicle seat 24 in which the operator (occupant) 18 (see FIG. 6) is seated; and a vision enhancement device 30 for use in a vehicle to enhance vision so that the line of sight of the operator 18 is maintained in an appropriate position during operation.

The vision enhancement device 30 for use in a vehicle comprises dividing means 34 for dividing the windshield 16 substantially horizontally into a plurality of areas; i.e., a first area 31, second area 32, and third area 33, and a control part 40 for controlling the first light emitting means 41 of the dividing means 34.

The dividing means 34 constitutes false image generating means which is disposed beneath the windshield 16, and which shows upper and lower false image lines 36 and 37 on the windshield 16.

The false image generating means 34 comprises first and second dividing lines 38 and 39 which extend in the vehicle width direction of the instrument panel 21, and first light emitting means 41 disposed on both end parts of the first and second dividing lines 38 and 39.

The first dividing line 38 shows the upper false image line 36 on the windshield 16. The second dividing line 39 shows the lower false image line 37 on the windshield 16.

The first and second dividing lines 38 and 39 have a color that presents a strong contrast to the instrument panel 21. For example, if the color of the surface of the instrument panel 21 is black, the first and second dividing lines 38 and 39 are formed with a white color or as lustrous chrome plated or other such surface.

The first and second dividing lines 38 and 39 are formed so that the false image shown on the windshield 16 by the reflection or emission of light from these dividing lines 38 and 39 can be seen in a substantially rectilinear form from the vantage point position of the operator. For example, in cases where the windshield 16 is curved on the side of the passenger compartment 12, the first and second dividing lines 38 and 39 are formed in a curvilinear shape along this curvature.

Consequently, the dividing lines 38 and 39 formed on the instrument panel 21 are shown in substantially rectilinear form as false images on the windshield 16, and divide the surface of the windshield 16 into a plurality of areas. Thus, false image generating means 34 disposed on the instrument panel 21 can be readily constructed.

The first light emitting means 41 comprise first left and right light emitting assemblies 43 and 44 disposed on either end of the first dividing line 38, and second left and right light emitting assemblies 45 and 46 disposed on either end of the second dividing line 39.

Figure 3:
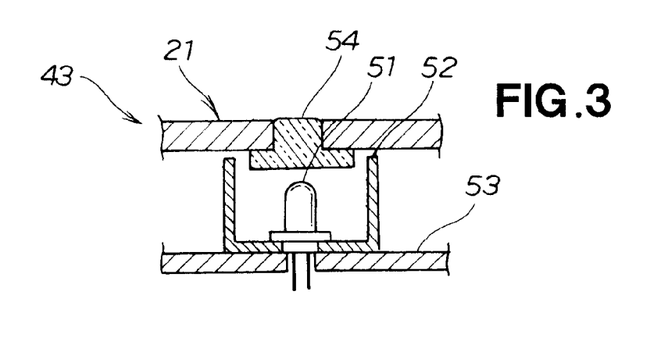
FIG. 3 is a sectional view taken along line 3-3 of FIG. 2.

As is shown in FIG. 3, the first left light emitting assembly 43 comprises a light emitting diode 51 which acts as a light source, a holder 52 for surrounding the light emitting diode 51, a substrate 53 for supporting the light emitting diode 51 and holder 52, and a lens 54 which is attached to the instrument panel 21, and which transmits the light emitted from the light emitting diode 51.

The structures of the first right light emitting assembly 44 and the second left and right light emitting assemblies 45 and 46 are the same as the structure of the first left light emitting assembly 43.

Figure 4:
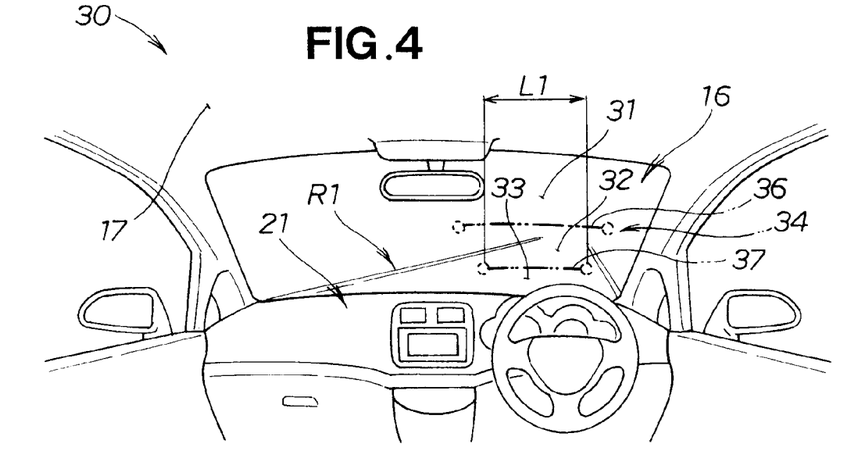
FIG. 4 is a schematic view illustrating determination of the length of the dividing means shown in FIG. 2.
Figure 5:
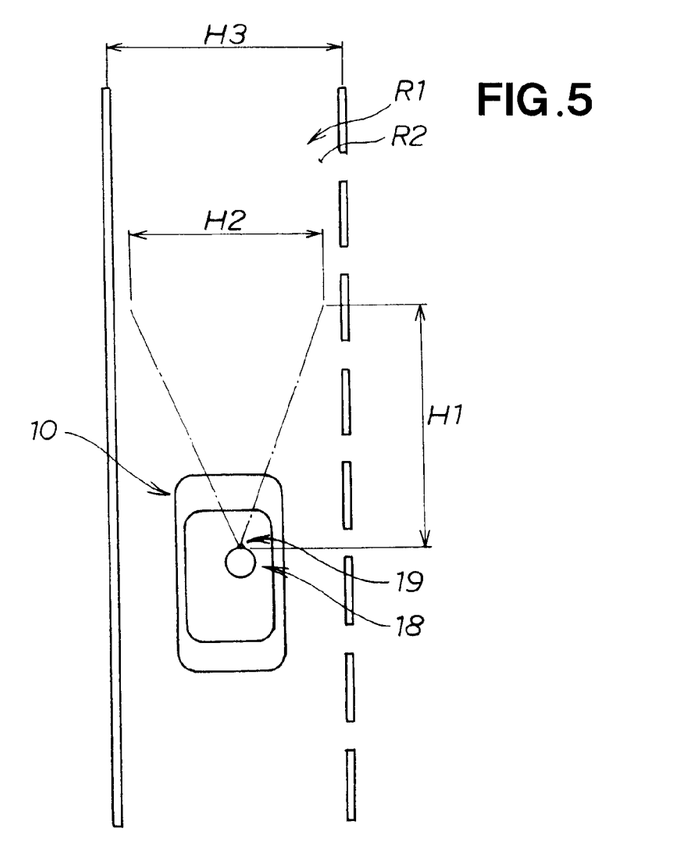
FIG. 5 is a plan view on the road of the vehicle shown in FIG. 1.

As is shown in FIGS. 4 and 5, the upper false image line 36 is a line for dividing the windshield 16 into a first area 31 and a second area 32. The lower false image line 37 is a line for dividing the windshield 16 into a second area 32 and a third area 33.

When the dividing lines 38 and 39 are projected onto the windshield 16 in correspondence with the road surface R2 a predetermined distance H1 ahead with the vantage point position (eye point) 19 of the operator 18 as a starting point, the length of the lower false image line 37 is formed as a length L1 which is such that the width H2 of the road surface R2 that is the predetermined distance H1 ahead is the same as or smaller than the lane width H3 area of the road R1.

For example, if the system is devised so that the visual field of the operator 18 from the windshield 16 is ensured, the line of sight of the operator 18 is maintained in an appropriate position, and the degree of attention to a predetermined area is increased, the operator 18 can be prompted to perform stable driving. Specifically, since the operator 18 is unconsciously caused to move the vehicle 10 toward the center of the lane, the operator 18 can be prompted to perform stable driving.

As is shown in FIG. 4, the windshield 16 is divided into three areas; i.e., a first area 31 formed between the roof 17 and the upper false image line 36, a second area 32 formed between the upper false image line 36 and the lower false image line 37, and a third area 33 formed between the lower false image line 37 and the instrument panel 21.

When an obstacle is present in a person's visual field so that this obstacle interferes with the visual field, this obstacle is avoided and the vantage point is moved so that the visual field is maintained. Specifically, the vantage point is determined so that the obstacle is positioned as far as possible in the periphery of the visual field, or so that the obstacle is removed from the visual field.

In the windshield 16, the peripheral roof 17 and instrument panel 21 correspond to strong obstacles. The upper and lower false image lines 36 and 37 correspond to weak obstacles. Accordingly, the line of sight of the operator tends to move to the second area 32, and does not reside for long in the first or third areas 31 or 33 where strong obstacles are present. Furthermore, the line of sight drawn into the second area 32 tends to be directed toward a portion removed from the upper and lower false image lines 36 and 37, which are weak obstacles. Accordingly, the line of sight is naturally directed toward the vicinity of the center of the second area 32, and maintained in an appropriate position.

Figure 6:
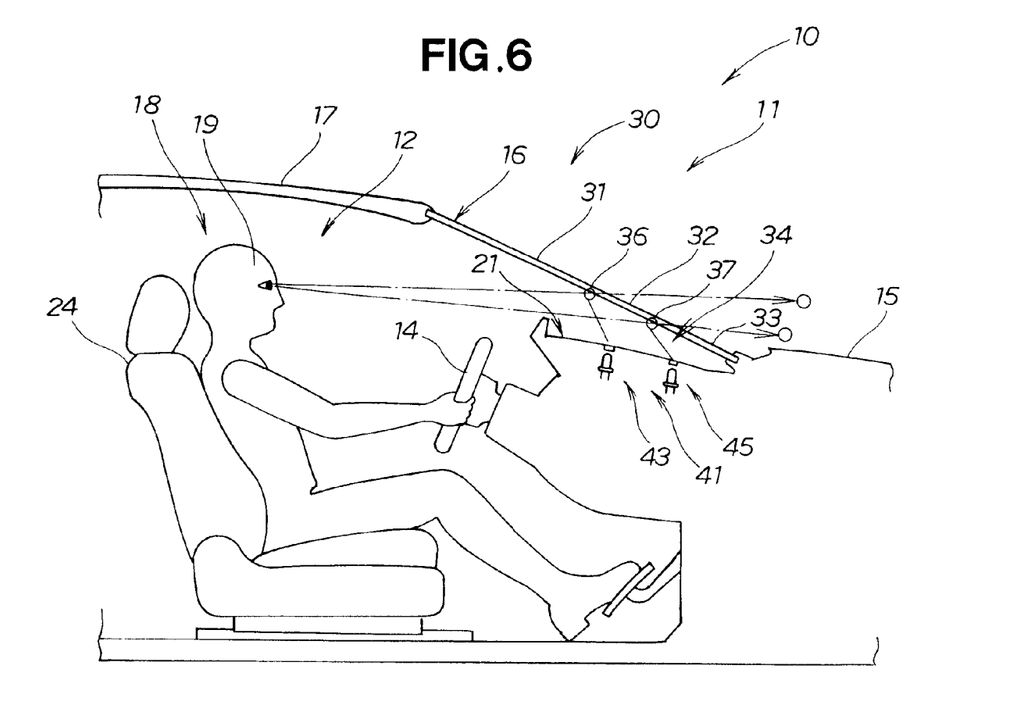
FIG. 6 is a side view of a vehicle mounting the vision enhancement device shown in FIG. 1.

Thus, as is shown in FIG. 6, since the line of sight is directed toward the vicinity of the center of the second area 32, and is maintained in an appropriate position, a stable visual field is obtained.

Figure 7:
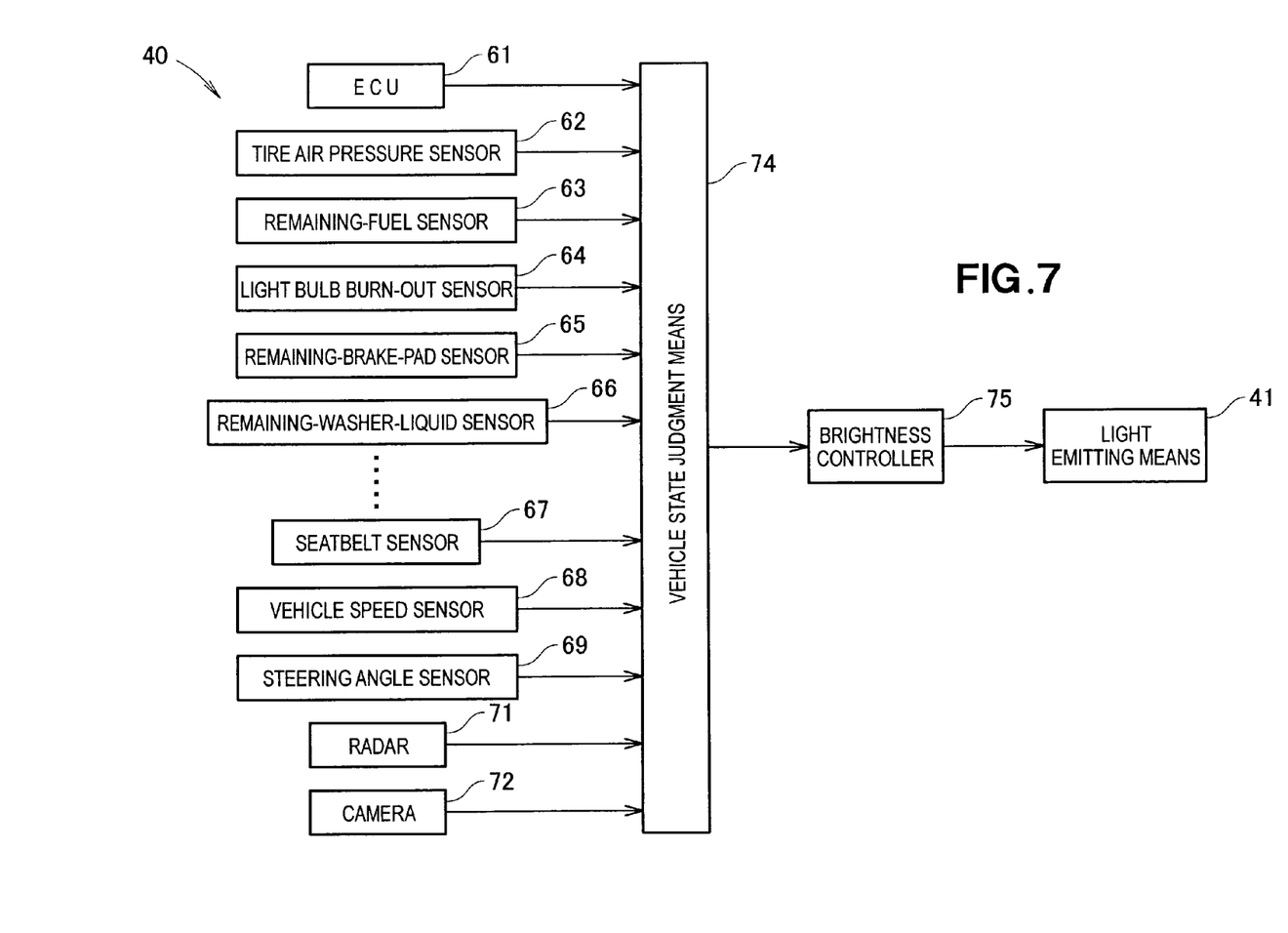
FIG. 7 is a block diagram showing one example of the control part shown in FIGS. 1 and 2.

FIG. 7 is a block diagram showing one example of the control part 40 of the vision enhancement device shown in FIGS. 1 and 2.

The control part 40 comprises vehicle state judgment means 74 for judging the state of the vehicle on the basis of information from an ECU 61 which controls the engine and the like, information from various types of sensors 62 through 69, and information from a radar 71 or information from a camera 72, and a brightness controller 75 for controlling the first light emitting means 41 from the judgment results of the vehicle state judgment means 74.

The brightness controller 75 may be devised so that at least a portion of the first light emitting means 41 flashes, so that the color of the light that is emitted varies, or so that the color of the emitted light itself flashes. Thus, by varying the emitted light, in cases where there are variations in the various types of vehicle conditions or environment surrounding the vehicle, these variations can be expressed to some extent.

For example, in cases where the vehicle state judgment means 74 judges that the air pressure of the tires is insufficient on the basis of information from an air pressure sensor 62, the first light emitting means 41 are illuminated or caused to flash by the brightness controller 75, and the operator 18 is informed that a change in the vehicle state has occurred. In this case, since the lighting or the like of the first light emitting means 41 is shown at both ends of the upper false image line 36 and lower false image line 37 shown on the windshield 16, the operator 18 can be informed of the change in the vehicle state without their line of sight being altered.

Furthermore, in cases where the proximity of vehicles ahead, proximity of vehicles behind, or the like is detected by the radar 71, or the proximity of a pedestrian is detected by the camera 72, the first light emitting means 41 are illuminated or caused to flash by the brightness controller 75, and the operator 18 is informed that there has been a change in the environment surrounding the vehicle 10.

According to the various types of sensors 63 through 69, for example, the remaining-fuel sensor 63 detects how much fuel is left, the light bulb burn-out sensor 64 detects that a light bulb has burned out, the remaining-brake-pad sensor 65 detects how much of the brake pads is left, the remaining-washer-liquid sensor 66 detects how much washer liquid is left, the seatbelt sensor 67 detects the fastened or non-fastened state of the seatbelts, the vehicle speed sensor 68 detects the vehicle speed, and the steering angle sensor 69 detects the steering angle. In cases where there is a need for a display on the basis of the various types of information detected by these sensors, the first light emitting means 41 are illuminated or caused to flash by the brightness controller 75, and the operator 18 is informed that there has been a change in the vehicle state.

In addition, although this is not shown in the drawings, in cases where the vehicle 10 is detected to have left the lane based on information provided by an HIDS (intelligent driver support system), where communication means informs the operator of the proximity of a vehicle, and where there is a call to a portable telephone or the like, the light emitting means may be illuminated or caused to flash.

Figure 8:
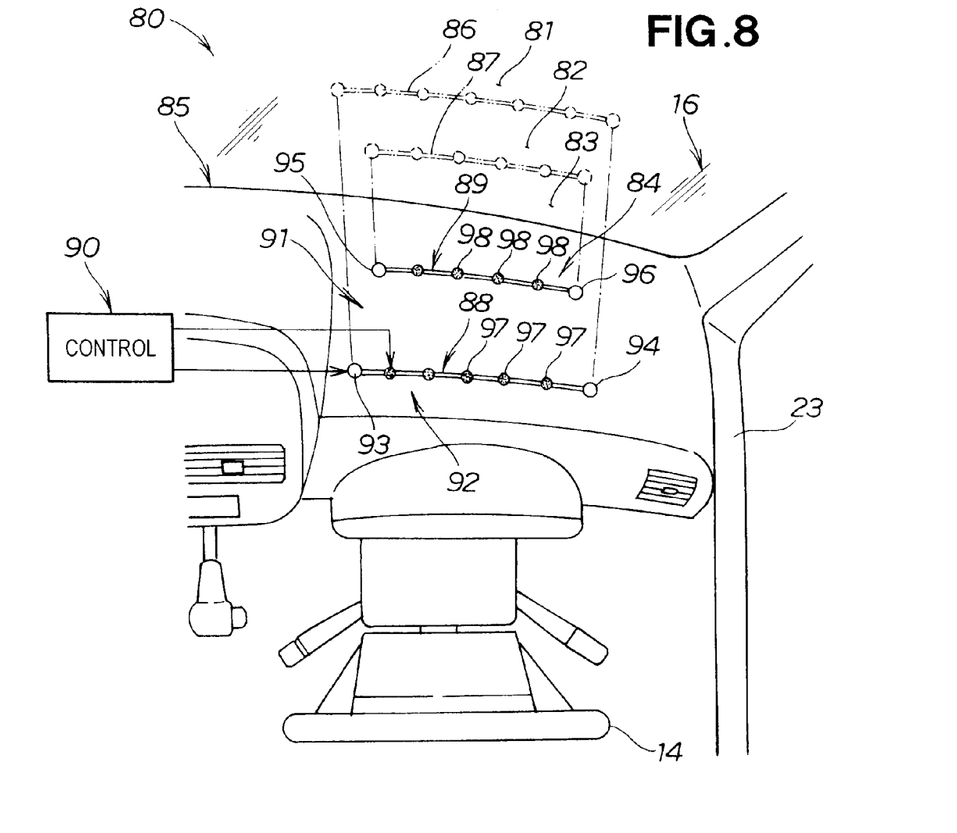
FIG. 8 is a plan view of a vision enhancement device for use in a vehicle, according to a second embodiment of the present invention.

FIG. 8 shows a second embodiment of the vision enhancement device.

The vision enhancement device 80 shown in FIG. 8 comprises dividing means 84 for dividing the windshield 16 substantially horizontally into a plurality of areas; i.e., a first area 81, a second area 82, and a third area 83, and a control part 90 for controlling the first light emitting means 91 and second light emitting means 92.

The dividing means 84 constitutes false image generating means, which is disposed beneath the windshield 16, and which shows an upper false image line 86 and a lower false image line 87 on the surface of the windshield 16.

The false image generating means 84 preferably comprises first and second dividing lines 88 and 89 disposed on an instrument panel 85, first light emitting means 91 comprising four light emitting bodies 93, 94, 95, and 96 disposed on either end parts of the first and second dividing lines 88 and 89, and second light emitting means 92 disposed on intermediate parts of the first and second dividing lines 88 and 89, and comprising a plurality of light emitting bodies 97 and a plurality of light emitting bodies 98 lined up intermittently.

In cases where there has been a change in the vehicle state, the first and second light emitting means 91 and 92 are illuminated or caused to flash by the control part 90, and the operator 18 is informed that there has been some kind of change in the vehicle state. In other words, since this lighting or flashing is shown as a false image on the windshield 16, information is transmitted without altering the visual field of the operator 18 (FIG. 6).

The second light emitting means 92 can emit light of a different color than that of the first light emitting means 91. Accordingly, the number of types of vehicle state information can be increased.

The number of types of vehicle state information can be increased by making it possible for at least portions of the first and second light emitting means 91 and 92 to flash.

Figure 9:
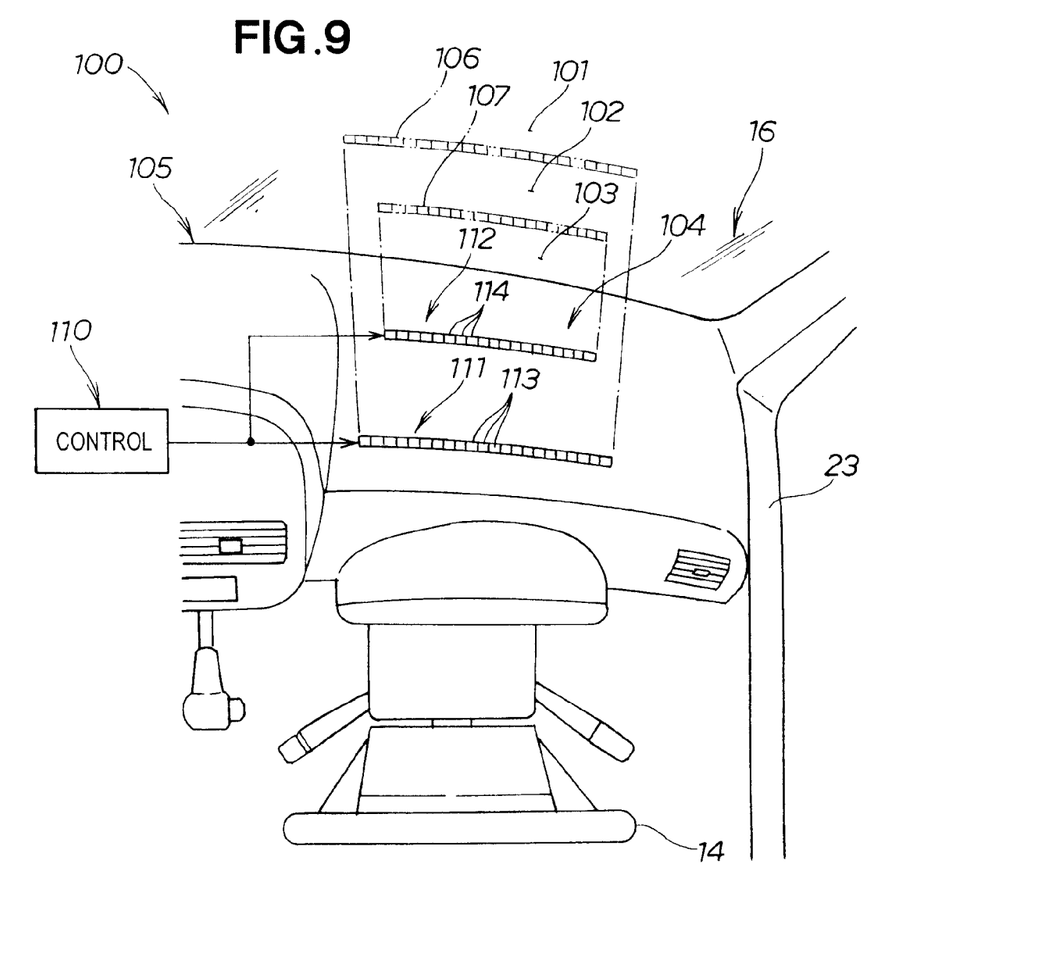
FIG. 9 is a plan view of a vision enhancement device for use in a vehicle, according to a third embodiment of the present invention.

FIG. 9 shows a third embodiment of the vision enhancement device 100.

The vision enhancement device 100 of the third embodiment comprises dividing means 104 for dividing the windshield 16 substantially horizontally into a plurality of areas (first through third areas) 101 through 103 and a control part 110 for controlling the first and second light emitting means 111 and 112 of the dividing means 104.

The dividing means 104, which is disposed below the windshield 16, constitutes false image generating means for showing an upper false line 106 and lower false line 107 on the windshield 16.

The false image generating means 104 preferably comprises first light emitting means 111 comprising a light emitting unit 113 consisting of numerous light emitting bodies (light emitting diodes) densely lined up in the form of a line on a substrate disposed on an instrument panel 105, and second light emitting means 112 comprising a light emitting unit 114 similarly comprising numerous light emitting bodies (light emitting diodes) densely lined up in the form of a line on a substrate disposed on the instrument panel 105.

The first light emitting means 111 constitutes a group of light emitting bodies of variable color, and shows an upper false image line 106 on the windshield 16. The second light emitting means 112 constitutes a group of light emitting bodies of variable color, and shows a lower false image line 107 on the windshield 16.

Specifically, the false image generating means 104 is disposed beneath the windshield 16, and generates a false image which is such that the false image lines can be recognized in substantially rectilinear form from the vantage point position of the operator 18 (FIG. 6). This false image generating means 104 emits light so that the false image lines overall have a plurality of different colors.

Figure 10A:
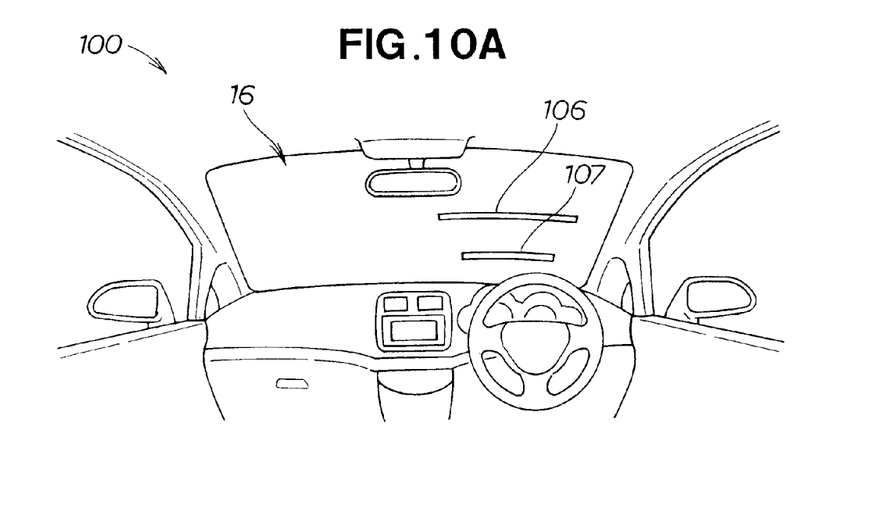
FIGS. 10A and 10B are schematic views illustrating the color variation of the vision enhancement device of the third embodiment shown in FIG. 9.
Figure 10B:
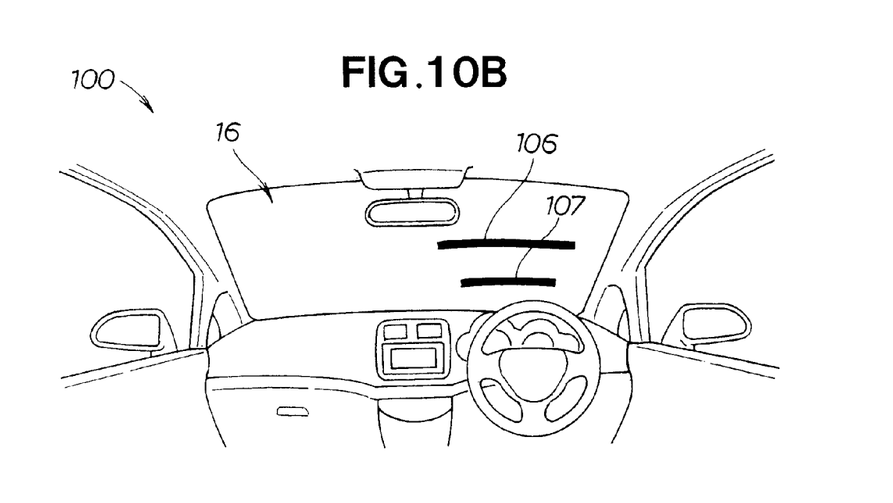

FIGS. 10A and 10B show an example of the color variation of the vision enhancement device of the third embodiment shown in FIG. 9.

In FIG. 10A, in the normal state of the vehicle 10, for example, the first and second light emitting means 111 and 112 emit light with a green color, and the upper and lower false image lines 106 and 107 are shown with a green color on the windshield 16.

In FIG. 10B, in cases where there has been some change in the vehicle state, the upper and lower false image lines 106 and 107 are shown with an orange color or red color on the windshield 16.

In this way, by varying the color of the light emitted by the dividing means 14 in accordance with the vehicle state or environment surrounding the vehicle, it is possible to inform the operator that there have been changes in the vehicle state or environment surrounding the vehicle. For example, an emergency can also be expressed by the color of the emitted light.

Figure 11A:
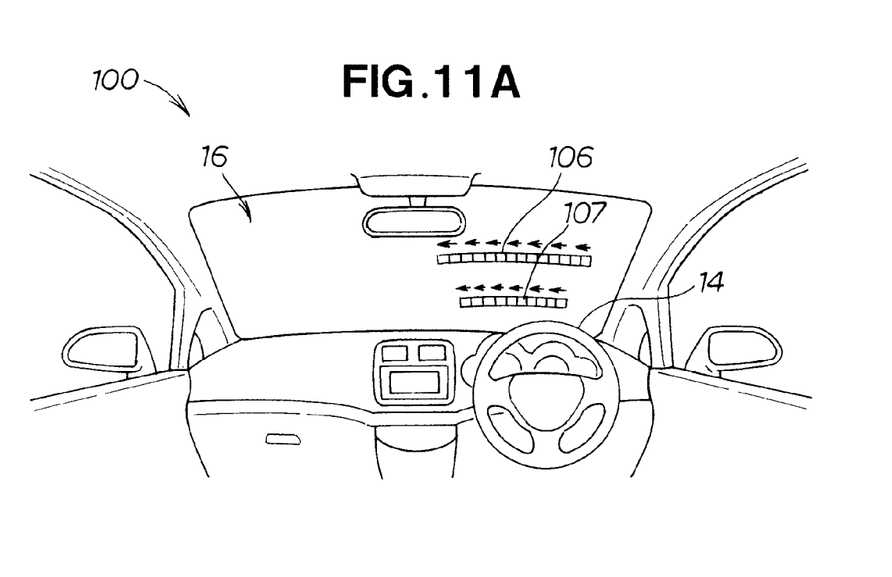
FIGS. 11A and 11B are schematic views showing the variation of the lighting of the vision enhancement device of the third embodiment shown in FIG. 9.
Figure 11B:
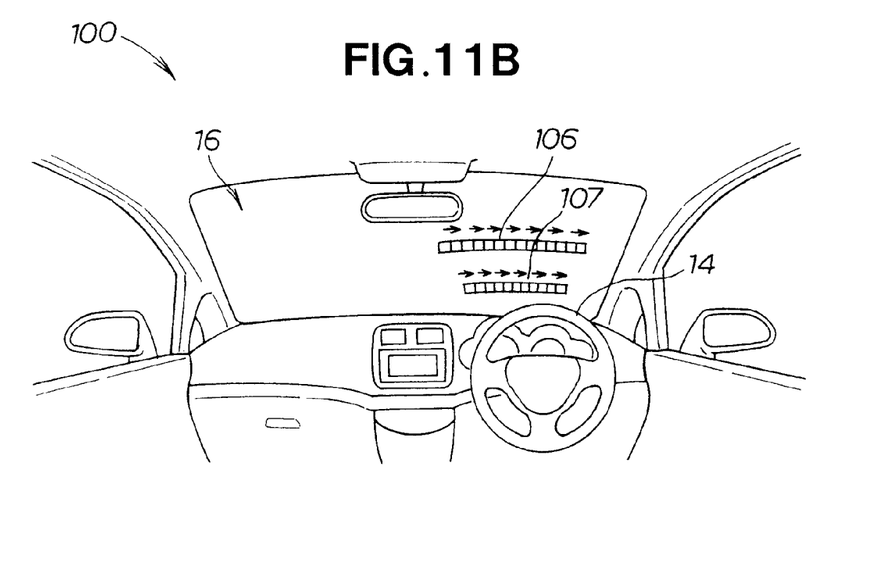

FIGS. 11A and 11B show variation in the lighting of the vision enhancement device of the third embodiment shown in FIG. 9.

In FIG. 11A, when the steering wheel 14 is turned to the left, the first and second light emitting means 111 and 112 shown in FIG. 9 are successively illuminated from right to left, and movement is shown in the upper and lower false image lines 106 and 107, indicating that the vehicle 10 is turning left.

In FIG. 11B, when the steering wheel 14 is turned to the right, the first and second light emitting means 111 and 112 are successively illuminated from the left to right, and movement is shown in the upper and lower false image lines 106 and 107, indicating that the vehicle 10 is turning right. Accordingly, the operator can be informed of changes in the vehicle state.

The vision enhancement device 100 can cause portions of the first and second light emitting means 111 and 112 shown in FIG. 9 to flash. If it is thus made possible to cause at least a portion of the false image generating means 104 to flash, a flashing operation of the color of the emitted light itself can be added to the variation in the color of the emitted light, and in cases where there are changes in the vehicle state or environment surrounding the vehicle 10, emergencies can be expressed in even greater detail.

Figure 12:
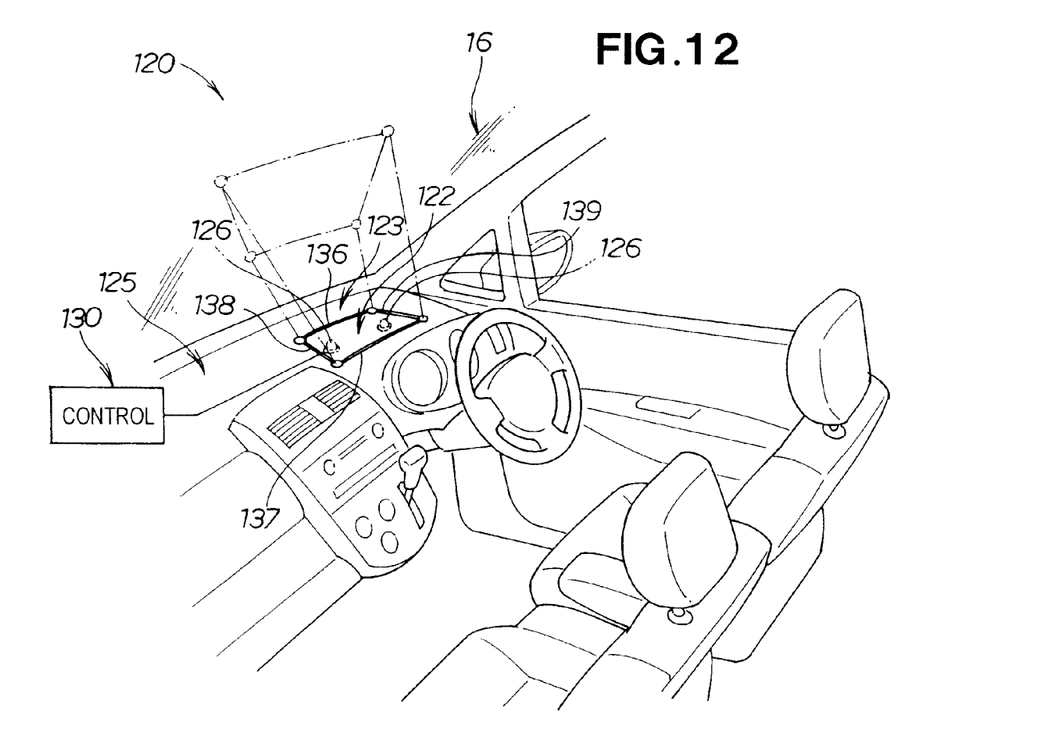
FIG. 12 is a perspective view of a vision enhancement device for use in a vehicle, according to a fourth embodiment of the present invention, as seen from the inside of the passenger compartment.

FIG. 12 shows a fourth embodiment of the vision enhancement device.

The vision enhancement device 120 of the fourth embodiment comprises a dashboard tray 122, which is disposed in the instrument panel 125, and which can accommodate small objects, lamps (or light emitting bodies) 126, 126 which illuminate the interior of the dashboard tray 122, and a control part 130 for controlling these lamps 126, 126. A dividing line 123 disposed on the dashboard tray 122 is projected onto the windshield 16, and the system is devised so that the light of the lamps 126, 126 leaks out from the corners of the dashboard tray 122.

The dividing line 123 is formed by the front and rear edges 136, 137 and left and right edges 138, 139 of the dashboard tray 122. The external shape of the dashboard tray 122 is defined so that when the dividing line 123 is projected onto the windshield 16, the front and rear edges 136, 137 and left and right edges 138, 139 are projected in a substantially rectilinear form.

In cases where there is a change in the vehicle state, the lamps 126, 126 are illuminated or caused to flash by the control part 130, and the operator is informed that there has been some change in the vehicle state.

For example, in cases where a portable telephone is accommodated inside the dashboard tray 122, the vibration or incoming calls of the portable telephone are detected, and the lamps 126, 126 are illuminated or caused to flash.

In the vision enhancement device 30 for use in a vehicle according to the first embodiment, an example was described in which the light emitting bodies 43 through 46 of the first light emitting means 41 were simultaneously illuminated or simultaneously caused to flash. However, the present invention is not limited to such an arrangement; it would also be possible for the light emitting bodies 43 through 46 to be separately illuminated or made to flash.

The vision enhancement device of the present invention for use in a vehicle described above is suitable for use in passenger vehicles such as sedans, wagons, or the like.

Obviously, various minor changes and modifications of the present invention are possible in light of the above teaching. It is therefore to be understood that within the scope of the appended claims the invention may be practiced otherwise than as specifically described.

What is claimed is:

1. A vision enhancement device for use in a vehicle, comprising:
dividing means for making a projection substantially horizontally on a surface of a windshield of the vehicle and thereby dividing the windshield into a plurality of areas, the dividing means being formed such that when the projection is made onto the windshield so as to correspond to a position of a road surface that is a predetermined distance ahead with a vantage point position of an operator used as a starting point, a projection width on the windshield is the same as or smaller than a lane width of the road,
wherein the dividing means comprise false image generating means disposed beneath the windshield for showing a false image on the windshield, and first light emitting means for emitting light for at least a portion of the dividing means, the false image generating means being configured so as to form a rectilinear false image that can be recognized in a substantially rectilinear manner from the vantage point position of the operator, the first light emitting means being designed to emit light more brightly in one portion of the rectilinear false image than in another portion.

2. The vision enhancement device of claim 1, wherein the false image generating means comprises dividing lines which are formed in an instrument panel disposed beneath the windshield.

3. The vision enhancement device of claim 2, wherein the second light emitting means emits light of a color that differs from that of the first light emitting means.

4. The vision enhancement device of claim 1, wherein the false image generating means comprises a second light emitting means, which forms a substantially rectilinear false image that can be recognized in a substantially rectilinear manner from the vantage point position of the operator.

5. The vision enhancement device of claim 4, wherein the first and second light emitting means are configured so that at least a portion of these means selectively flash.

6. The vision enhancement device of claim 1, wherein the dividing means communicates with at least one vehicle sensor and the first light emitting means changes the brightness of the emitted light in one portion of the rectilinear false image relative to another portion of the rectilinear false image in response to a predetermined output of the vehicle sensor.

7. A vision enhancement device for use in a vehicle, comprising:
dividing means for making a projection substantially horizontally on a surface of a windshield of a vehicle and thereby dividing the windshield into a plurality of areas, the dividing means being formed so that when the projection is made onto the windshield so as to correspond to a position of a road surface that is a predetermined distance ahead with a vantage point position of an operator used as a starting point, a projection width on the windshield is the same as or smaller than a lane width of the road,
wherein the dividing means is disposed beneath the windshield for showing a false image on the windshield, the false image being substantially rectilinear as seen from the vantage point position of the operator and having at least a first section having a first color and a second section having a second color different from the first color, and
wherein the dividing means communicates with at least one vehicle sensor and changes a color of one of the first and second sections in response to a predetermined output of the vehicle sensor.

8. The vision enhancement device of claim 7, wherein at least one portion of the dividing means flashes.

9. The vision enhancement device of claim 8, wherein the dividing means communicates with at least one vehicle sensor and flashes in response to a predetermined output of the vehicle sensor.

* * * * *